(12) United States Patent
Chung et al.

(10) Patent No.: US 9,077,432 B2
(45) Date of Patent: Jul. 7, 2015

(54) TWO-WAY RELAY, WIRELESS APPARATUS AND SIGNAL PROCESSING METHOD THEREOF

(71) Applicant: Institute for Information Industry, Taipei (TW)

(72) Inventors: I-Chou Chung, Zhuolan Township (TW); David W. Lin, Hsinchu (TW); Shih-Jung Lu, Kaohsiung (TW); Chun-Che Chien, Taipei (TW); Tsung-Yu Tsai, Tainan (TW)

(73) Assignee: Institute For Information Industry, Taipei (TW)

( * ) Notice: Subject to any disclaimer, the term of this patent is extended or adjusted under 35 U.S.C. 154(b) by 11 days.

(21) Appl. No.: 14/051,929

(22) Filed: Oct. 11, 2013

(65) Prior Publication Data

US 2014/0105253 A1    Apr. 17, 2014

Related U.S. Application Data

(60) Provisional application No. 61/712,814, filed on Oct. 12, 2012.

(51) Int. Cl.
*H04B 7/26* (2006.01)
*H04B 7/15* (2006.01)

(52) U.S. Cl.
CPC ............... *H04B 7/2606* (2013.01); *H04B 7/15* (2013.01)

(58) Field of Classification Search
USPC .......................................................... 375/211
See application file for complete search history.

(56) References Cited

U.S. PATENT DOCUMENTS

| 7,920,501 | B2 | 4/2011 | Larsson et al. |
| 8,126,033 | B2 | 2/2012 | Jung et al. |
| 8,792,539 | B2 * | 7/2014 | Larsson ........................ 375/220 |
| 2003/0086515 | A1 * | 5/2003 | Trans et al. ................... 375/346 |
| 2008/0125032 | A1 * | 5/2008 | Jung et al. ......................... 455/7 |
| 2010/0194592 | A1 * | 8/2010 | Yim et al. ..................... 340/905 |
| 2011/0103292 | A1 * | 5/2011 | Pasad et al. ................... 370/315 |
| 2014/0348216 | A1 * | 11/2014 | Lin et al. ....................... 375/211 |

OTHER PUBLICATIONS

Tao Cui et al., "Memoryless relay strategies for two-way relay channels," Communications, IEEE Transactions on , vol. 57, No. 10, pp. 3132,3143, Oct. 2009 2008.*
Koike-Akino, T. et al., "Optimized constellations for two-way wireless relaying with physical network coding," Selected Areas in Communications, IEEE Journal on , vol. 27, No. 5, pp. 773,787, Jun. 20097.*
Fischer, Robert, "Precoding and Signal Shaping for Digital Transmission," New York; Wiley, 2002—Internet Citation—Available at : http://samples.sainsburysebooks.co.uk/9780471727729_sample_385869.pdf.*

* cited by examiner

*Primary Examiner* — Daniel Washburn
*Assistant Examiner* — Berhanu Tadese
(74) *Attorney, Agent, or Firm* — Skaar Ulbrich Macari, P.A.

(57) ABSTRACT

A two-way relay, a wireless apparatus and a signal processing method thereof are provided. The two-way relay comprises a transceiver and a processor. The transceiver receives a relay receiving signal including a first terminal transmitting signal transmitted by a first wireless apparatus and a second terminal transmitting signal transmitted by a second wireless apparatus. The processor, which is electrically connected to the transceiver, uses a mapping function to transform the relay receiving signal into a relay signal and enables the transceiver to broadcast the relay signal.

18 Claims, 2 Drawing Sheets

TWO-WAY RELAY, WIRELESS APPARATUS AND SIGNAL PROCESSING METHOD THEREOF

PRIORITY

This application claims the benefit of U.S. Provisional Application Ser. No. 61/712,814 filed on Oct. 12, 2012, which is hereby incorporated by reference in its entirety.

FIELD

The present invention relates to a two-way relay, a wireless apparatus and a signal processing method thereof. More specifically, the two-way relay of the present invention uses a mapping function to transform signals received from two wireless apparatuses into a relay signal having a relatively low transmit power and broadcasts the relay signal to the two wireless apparatuses.

BACKGROUND

With development of the modern wireless communications, relays have become indispensable wireless communication apparatuses. Through use of the relays, the communication coverage of the wireless networks gets extended, so ubiquitous and diverse wireless communication services can be provided.

Relay systems currently conceived are mainly classified into the following two kinds of architecture: one-way and two-way. Because two-way relay systems have higher spectrum utilization efficiency than one-way relay systems, two-way relay systems are expected to grow in usage in the future. Currently in a two-way relay system, the two-way relay plays the relaying role through one of the following two commonly used signal processing schemes in the broadcast phase: the Amplify-and-Forward (AF) scheme and the Decoded-and-Forward (DF) scheme. However, the AF scheme has the problem that the transmit power of the two-way relay is high, and the DF scheme has the problem that the two-way relay suffers from a high computational complexity.

Accordingly, an urgent need exists in the art to provide a signal processing scheme that can reduce either the transmit power or the computational complexity of the two-way relay.

SUMMARY

An objective of the present invention is to provide a two-way relay, a wireless apparatus and a signal processing method thereof. The present invention in certain embodiments provides a Modulo-and-Forward (MF) signal processing method that can reduce the transmit power necessary for the two-way relay to forward a signal with a low computational complexity. Thereby, the MF signal processing method of certain embodiments of the present invention can reduce the transmit power of the two-way relay as compared with the conventional AF signal processing method, and can reduce the computational complexity as compared with the conventional DF signal processing method.

To this end, the present invention according to certain embodiments discloses a two-way relay for a wireless communication system, which comprises a transceiver and a processor. The transceiver is configured to receive a relay receiving signal. The relay receiving signal comprises a first terminal transmitting signal transmitted by a first wireless apparatus and a second terminal transmitting signal transmitted by a second wireless apparatus. The processor, which is electrically connected to the transceiver, is configured to use a mapping function to transform the relay receiving signal into a relay signal and enable the transceiver to broadcast the relay signal. The mapping function is: $f_{MF}(x) = \alpha \cdot c \bmod(\beta x + C, B)$, where $\alpha$ is a transmit power scaling factor, $\beta$ is a phase rotation factor, x is the relay receiving signal, C is an offset, B is a modulus, and $c \bmod(\cdot)$ is a complex modulo function and is defined as follows: $c \bmod(x_1 + jx_Q, B) = \bmod(x_1, B) + j \bmod(x_Q, B)$, where $x_1$ is a real component of a complex input signal, $x_Q$ is an imaginary component of the complex input signal, and $\bmod(\cdot)$ is a modulo function and is defined as follows: $\bmod(A, B) = [(A + B/2) \% B] - B/2$, where A is an input signal and % is an asymmetric modulo operator defined as follows: $p \% q = p - \lfloor p/q \rfloor q$ where p and q are any two real numbers and $\lfloor p/q \rfloor$ means taking the largest integer smaller or equal to p/q.

To this end, the present invention according to certain embodiments further discloses a wireless apparatus for the wireless communication system. When the wireless apparatus is the first wireless apparatus, the wireless apparatus is configured to receive a first terminal receiving signal from the two-way relay and, according to a first separated signal function, obtain a second separated signal corresponding to the second terminal transmitting signal, and the first separated signal function is defined as follows: $r_0 = c \bmod(y_0/h_0/\alpha - C - \beta h_0 x_0, B)/\beta$, where $r_0$ is the second separated signal, $y_0$ is the first terminal receiving signal, and $x_0$ is the first terminal transmitting signal. When the wireless apparatus is the second wireless apparatus, the wireless apparatus is configured to receive a second terminal receiving signal corresponding to the relay signal and, according to a second separated signal function, obtain a first separated signal corresponding to the first terminal transmitting signal, and the second separated signal function is defined as follows: $r_1 = c \bmod(y_1/h_1/\alpha - C - \beta h_1 x_1, B)/\beta$, where $r_1$ is the first separated signal, $y_1$ is the second terminal receiving signal, and $x_1$ is the second terminal transmitting signal. The first terminal transmitting signal is transmitted by the first wireless apparatus and is to be transmitted to the second wireless apparatus via the two-way relay, and the second terminal transmitting signal is transmitted by the second wireless apparatus and is to be transmitted to the first wireless apparatus via the two-way relay.

Further, the present invention according to certain embodiments discloses a signal processing method for a two-way relay. The two-way relay comprises a transceiver and a processor. The signal processing method is executed by the processor and comprises the following steps of: (a) receiving a relay receiving signal via the transceiver, wherein the relay receiving signal comprises a first terminal transmitting signal transmitted by a first wireless apparatus and a second terminal transmitting signal transmitted by a second wireless apparatus; (b) using a mapping function to transform the relay receiving signal into a relay signal; and (c) enabling the transceiver to broadcast the relay signal. The mapping function is: $f_{MF}(x) = \alpha \cdot c \bmod(\beta x + C, B)$, where $\alpha$ is a transmit power scaling factor, $\beta$ is a phase rotation factor, x is the relay receiving signal, C is an offset, B is a modulus, and $c \bmod(\cdot)$ is a complex modulo function and is defined as follows: $c \bmod(x_1 + jx_Q, B) = \bmod(x_1, B) + j \bmod(x_Q, B)$, where $x_1$ is a real component of a complex input signal, $x_Q$ is an imaginary component of the complex input signal, and $\bmod(\cdot)$ is a modulo function and is defined as follows: $\bmod(A, B) = [(A + B/2) \% B] - B/2$, where A is an input signal and % is an asymmetric modulo operator defined as follows: $p \% q = p - \lfloor p/q \rfloor q$ where p and q are any two real numbers and $\lfloor p/q \rfloor$ means taking the largest integer smaller or equal to p/q.

The detailed technology and preferred embodiments implemented for the subject invention are described in the following paragraphs accompanying the appended drawings for people skilled in this field to well appreciate the features of the claimed invention.

DETAILED DESCRIPTION

In the following description, the present invention will be explained with reference to example embodiments thereof. However, these example embodiments are not intended to limit the present invention to any specific examples, embodiments, environment, applications or particular implementations described in these example embodiments. Therefore, description of these embodiments is only for purpose of illustration rather than to limit the present invention, and the scope of this application shall be governed by the claims. It should be appreciated that, in the following embodiments and the attached drawings, elements unrelated to the present invention are omitted from depiction; and dimensional relationships among individual elements in the attached drawings are illustrated only for ease of understanding, but not to limit the actual scale.

Figure 1:
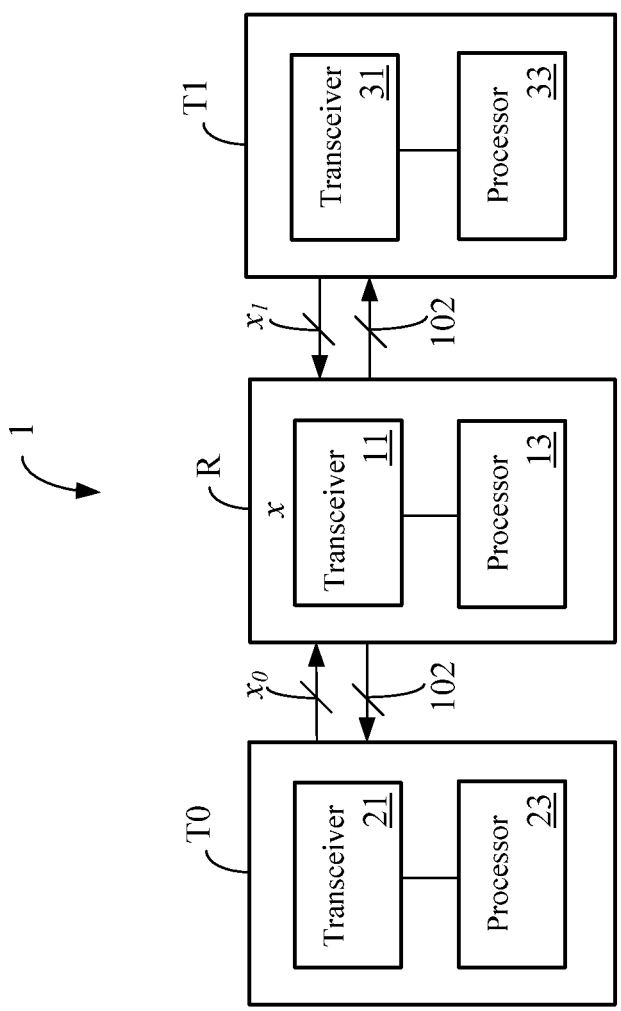
FIG. 1 is a schematic view illustrating a wireless communication system 1 according to a first to a fourth embodiment of the present invention.

A first embodiment of the present invention is shown in FIG. 1, which is a schematic view of a wireless communication system 1. The wireless communication system 1 (e.g., a 3GPP (3$^{rd}$ Generation Partnership Project) communication system) comprises a two-way relay wireless communication apparatus R, a first wireless apparatus T0 and a second wireless apparatus T1.

The first wireless apparatus T0 comprises a transceiver 21 and a processor 23 electrically connected with the transceiver 21. The second wireless apparatus T1 comprises a transceiver 31 and a processor 33 electrically connected with the transceiver 31. The first wireless apparatus T0 and the second wireless apparatus T1 communicate with each other via the two-way relay wireless communication apparatus R.

The two-way relay wireless communication apparatus R comprises a transceiver 11 and a processor 13 electrically connected with the transceiver 11. In a multiple access (MAC) phase, the first wireless apparatus T0 transmits a first terminal transmitting signal $x_0$ and, at the same time, the second wireless apparatus T1 transmits a second terminal transmitting signal $x_1$.

Then, a relay receiving signal x is received by the two-way relay wireless communication apparatus R. The relay receiving signal x may be represented by $x=x_0 \cdot h_0 + x_1 \cdot h_1 + z_R$, where $h_0$ is a first channel coefficient associated with the first terminal transmitting signal $x_0$, $h_1$ is a second channel coefficient associated with the second terminal transmitting signal $x_1$, and $z_R$ is the additive noise at the two-way relay wireless communication apparatus R.

Next, the Modulo-and-Forward (MF) signal processing method of the present invention will be described. After having received the relay receiving signal x, the processor 13 uses a mapping function to transform the relay receiving signal x into a relay signal 102. The mapping function is represented by the following Equation 1:

$$f_{MF}(x) = \alpha \cdot c \bmod(\beta x + C, B) \tag{1}$$

where, x is an input signal (here, the relay receiving signal) of the function, $\alpha$ is a transmit power scaling factor, $\beta$ is a phase rotation factor, C is an offset, B is a modulus, and c mod($\cdot$) is a complex modulo function and is defined by the following Equation 2:

$$c \bmod(x_1 + jx_Q, B) = \bmod(x_1, B) + j \bmod(x_Q, B) \tag{2}$$

where $x_1$ is a real component of a complex input signal (here, the relay receiving signal), $x_Q$ is an imaginary component of the complex input signal, and mod($\cdot$) is a modulo function and is defined by the following Equation 3:

$$\bmod(A, B) = \lfloor (A + B/2) \% B \rfloor - B/2 \tag{3}$$

where A is an input signal, and % is an asymmetric modulo operator defined as follows: $p \% q = p - \lfloor p/q \rfloor q$ where p and q are any two real numbers and $\lfloor p/q \rfloor$ means taking the largest integer smaller or equal to p/q. After the relay receiving signal x has been transformed into the relay signal 102 by use of the mapping function, the processor 13 enables the transceiver 11 to broadcast the relay signal 102 to the first wireless apparatus T0 and the second wireless apparatus T1 in a broadcast (BC) phase.

Similarly, the relay signal 102 is liable to influence of the channel effect between the two-way relay wireless communication apparatus R and the first and the second wireless apparatuses T0 and T1 during transmission. Therefore, a first terminal receiving signal $y_0$ received by the first wireless apparatus T0 may be represented by $y_0 = h_0 \cdot f_{MF}(x) + z_{T0}$, and a second terminal receiving signal $y_1$ received by the second wireless apparatus T1 may be represented by $y_1 = h_1 \cdot f_{MF}(x) + z_{T1}$, where $z_{T0}$ is an additive noise and $z_{T1}$ is also an additive noise.

After the first terminal receiving signal $y_0$ is received by the transceiver 21 of the first wireless apparatus T0, the processor 23 calculates a second separated signal corresponding to the second terminal transmitting signal from the first terminal receiving signal $y_0$ according to a first separated signal function, where the first separated signal function is defined as the following Equation 4:

$$r_0 = c \bmod(y_0/h_0/\alpha - C - \beta h_0 x_0, B)/\beta \tag{4}$$

where, $r_0$ is the second separated signal, and $y_0$ is the first terminal receiving signal. It shall be particularly appreciated that, as will be understood by those of ordinary skill in the art, the second separated signal $r_0$ is equal to the second terminal transmitting signal $x_1$ if the influence of noises is not taken into account and if it is assumed that the channel effect can be ideally compensated.

Similarly, after the second terminal receiving signal $y_1$ is received by the transceiver 31 of the first wireless apparatus T1, the processor 33 calculates a first separated signal corresponding to the first terminal transmitting signal from the second terminal receiving signal $y_1$ according to a second separated signal function, where the second separated signal function is defined as the following Equation 5:

$$r_1 = c \bmod(y_1/h_1/\alpha - C - \beta h_1 x_1, B)/\beta \tag{5}$$

where, $r_1$ is the first separated signal, and $y_1$ is the first terminal receiving signal. It shall be particularly appreciated that, as will be understood by those of ordinary skill in the art, the first separated signal $r_1$ is equal to the first terminal transmitting signal $x_0$ if the influence of noises is not taken into account and if it is assumed that the channel effect can be ideally compensated.

A second embodiment of the present invention is shown also in FIG. 1. The second embodiment further discloses an implementation in which the first terminal transmitting signal $x_0$ and the second terminal transmitting signal $x_1$ are pulse amplitude modulation (PAM) signals.

When the first terminal transmitting signal $x_0$, the second terminal transmitting signal $x_1$ and the relay receiving signal $x$ are pulse amplitude modulation (PAM) signals, the phase rotation factor $\beta$ is 1, and the imaginary component $x_Q$, of each of the signals is 0. In this case, let the modulus B be as shown by the following Equation 6:

$$B = 2 \cdot \max(a_0 M_0 |h_0|, a_1 M_1 |h_1|) \quad (6)$$

where, $a_0$ and $a_1$ are signal scaling factors, $M_0$ is a PAM modulation order of the first terminal transmitting signal $x_0$, and $M_1$ is a PAM modulation order of the second terminal transmitting signal $x_1$.

An example is provided below to illustrate the ability of this invention to reduce the transmit power of the relay station in the relaying of PAM signals, as compared to the present art. For ease of description, the comparison will be made in terms of peak transmit power. It will be understood by those skilled in the art that, in addition to the peak transmit power, the average transmit power of the relay station is also reduced by this invention.

For this example, a case where the first terminal transmitting signal $x_0$ and the second terminal transmitting signal $x_1$ are 4-PAM signals (the PAM modulation order $M_0$ of the first terminal transmitting signal $x_0$ and the PAM modulation order $M_1$ of the second terminal transmitting signal $x_1$ are both 4) and the possible signal values thereof are $-3a$, $-1a$, $1a$ or $3a$, with $a_0$ and $a_1$ both equal to $a$, will be described. When the signal scaling factor $a$ is 1, the transmit power scaling factor $\alpha$ is 1, and the first channel coefficient $h_0$ and the second channel coefficient $h_1$ are both 1, the modulus B calculated from Equation 6 is 8.

Then, in a case where the offset is not taken into account (i.e., the offset C is 0), the possible signal values of the first terminal transmitting signal $x_0$ and the second terminal transmitting signal $x_1$ are both +3, +1, −1, and −3, and the noise in each receiving signal is assumed to be 0, the maximum possible amplitude of the relay signal 102 obtained from Equation 1 is 4 and the peak transmit power thereof is 16 (a square of 4). As can be seen, the peak transmit power of the relay station for the relay signal 102 can be decreased from 36 (a square of the maximum possible amplitude of the relay receiving signal $x$, i.e., a square of 6) to 16 as compared with the conventional Amplify-and-Forward (AF) signal processing scheme. Furthermore, a second separated signal $r_0$ of value equal to $x_1$ can be obtained by substituting the first terminal receiving signal $y_0$ into the first separated signal function (i.e., Equation 4). Similarly, a first separated signal $r_1$ of value equal to $x_0$ can be obtained by substituting the second terminal receiving signal $y_1$ into the second separated signal function (i.e., Equation 5).

Further in a case where the offset C is 1 (i.e., the offset $C = B/2M_i$, where $i = \arg \max (a_i M_i |h_i|, i = 0$ or $1)$), the maximum possible amplitude of the relay signal 102 obtained from Equation 1 is 3 and the peak transmit power thereof is 9 (a square of 3). Accordingly, the peak transmit power of the relay station for the relay signal 102 can be decreased from 36 (a square of the maximum possible amplitude of the relay receiving signal $x$, i.e., a square of 6) to 9 as compared with the conventional Amplify-and-Forward (AF) signal processing scheme. Similarly, a second separated signal $r_0$ of value equal to $x_1$ can be obtained by substituting the first terminal receiving signal $y_0$ into the first separated signal function (i.e., Equation 4); and a first separated signal $r_1$ of value equal to $x_0$ can be obtained by substituting the second terminal receiving signal $y_1$ into the second separated signal function (i.e., Equation 5).

A third embodiment of the present invention is shown also in FIG. 1. The third embodiment further discloses an implementation in which the first terminal transmitting signal $x_0$ and the second terminal transmitting signal $x_1$ are quadrature amplitude modulation (QAM) signals.

Let the modulus B be as shown by the following Equation 7:

$$B = 2 \cdot \max\{a_0 M_0 |h_0| \sec(\mathrm{mod}(\theta_0 + \theta, \pi/2)), a_1 M_1 |h_1| \sec(\mathrm{mod}(\theta_1 + \theta, \pi/2))\} \quad (7)$$

where, $a_0$ and $a_1$ are signal scaling factors, $M_0$ is a root value of a QAM modulation order of the first terminal transmitting signal $x_1$, $\theta_0$ is a first channel phase angle of the first channel coefficient, $M_1$ is a root value of a QAM modulation order of the second terminal transmitting signal $x_1$, and $\theta_1$ is a second channel phase angle of the second channel coefficient. In addition, $\theta$ is a phase angle whose value is greater than or equal to $-\pi/4$ and smaller than $\pi/4$, and the phase rotation factor is $e^{j\theta}$.

An example is provided below to illustrate the ability of this invention to reduce the transmit power of the relay station in the relaying of QAM signals, as compared to the present art. For ease of description, the comparison will be made in terms of peak transmit power. It will be understood by those skilled in the art that, in addition to the peak transmit power, the average transmit power of the relay station is also reduced by this invention.

For this example, a case where the first terminal transmitting signal $x_0$ and the second terminal transmitting signal $x_1$ are 16-QAM signals, and possible signal values of a real component and an imaginary component of the first terminal transmitting signal $x_0$ and the second terminal transmitting signal $x_1$ are $-3a$, $-1a$, $1a$ or $3a$, with $a_0$ and $a_1$ both equal to $a$, will be described. If the signal scaling factor $a$ is 1, the transmit power scaling factor $\alpha$ is 1, the first channel coefficient $h_0$ is 1, the second channel coefficient $h_1$ is 1, the first channel phase angle $\theta_0$ is 0, the second channel phase angle $\theta_1$ is 0, the QAM modulation order of the first terminal transmitting signal $x_0$ is 16 (i.e., $M_0 = 4$), the QAM modulation order of the second terminal transmitting signal $x_1$ is also 16 (i.e., $M_1 = 4$), and $z_R$ is 0, then the maximum possible amplitude of the relay receiving signal $x$ is $6\sqrt{2}$.

The modulus B is calculated to be 8 according to Equation 7 if the phase rotation is not taken into account (i.e., the phase rotation factor $\beta$ is 1, and $\theta$ is 0). Additionally, if the offset is not taken into account (i.e., the offset C is 0), then, by substituting the transmit power scaling factor $\alpha$, the phase rotation factor $\beta$, the relay receiving signal $x$, the offset C and the modulus B into the mapping function (i.e., Equation 1), the maximum possible amplitude of the relay signal 102 will be calculated to be $4\sqrt{2}$, and the peak transmit power thereof is 32. Accordingly, the peak transmit power of the relay station for the relay signal 102 can be decreased from 72 (a square of the maximum possible amplitude of the relay receiving signal $x$, i.e., a square of $6\sqrt{2}$) to 32 as compared with the conventional Amplify-and-Forward (AF) signal processing scheme.

Additionally, if the phase rotation is not taken into account (i.e., the phase rotation factor $\beta$ is 1, and $\theta$ is 0) but the offset is taken into account and be such that $C = (B/2M_i) + j(B/2M_i)$, where $i = \arg \max \{a_i M_i |h_i| \sec(\mathrm{mod}(\theta_i + \theta, \pi/2)), i = 0$ or $1\}$, then C is $1+j$. Then, by substituting the transmit power scaling factor $\alpha$, the phase rotation factor $\beta$, the relay receiving signal $x$, the offset C and the modulus B into the mapping function (i.e., Equation 1), the maximum possible amplitude of the relay signal 102 will be calculated to be $3\sqrt{2}$, and the peak transmit power thereof is 18. Accordingly, the peak transmit power of the relay station for the relay signal 102 can be decreased from 72 (a square of the maximum possible amplitude of the relay receiving signal x, i.e., a square of $6\sqrt{2}$) to 18 as compared with the conventional Amplify-and-Forward (AF) signal processing scheme.

Next, the first wireless apparatus T0 calculates the second separated signal $r_0$ according to the first separated signal function (i.e., Equation 4), and the second wireless apparatus T1 calculates the first separated signal $r_1$ according to the second separated signal function (i.e., Equation 5).

A fourth embodiment of the present invention is shown also in FIG. 1. The fourth embodiment further discloses an implementation in which the first terminal transmitting signal $x_0$ and the second terminal transmitting signal $x_1$ are quadrature amplitude modulation (QAM) signals.

An example is provided below to illustrate the ability of this invention to reduce the transmit power of the relay station in the relaying of QAM signals, as compared to the present art. For ease of description, the comparison will be made in terms of peak transmit power. It will be understood by those skilled in the art that, in addition to the peak transmit power, the average transmit power of the relay station is also reduced by this invention.

For this example, a case where the first terminal transmitting signal $x_0$ and the second terminal transmitting signal $x_1$ are 16-QAM signals, and possible signal values of a real component and an imaginary component of the first terminal transmitting signal $x_0$ and the second terminal transmitting signal $x_1$ are $-3a$, $-1a$, $1a$ or $3a$, with $a_0$ and $a_1$ both equal to a, will be described. If the signal scaling factor a is 1, the transmit power scaling factor $\alpha$ is 1, the first channel coefficient $h_0$ is $e^{j\pi/4}$, the second channel coefficient $h_1$ is $e^{-j\pi/4}$, the first channel phase angle $\theta_0$ is $\pi/4$, the second channel phase angle $\theta_1$ is $-\pi/4$, the QAM modulation order of the first terminal transmitting signal $x_0$ is 16 (i.e., $M_0=4$), the QAM modulation order of the second terminal transmitting signal $x_1$ is also 16 (i.e., $M_1=4$), and $z_R$ is 0, then the maximum possible amplitude of the relay receiving signal x is $6\sqrt{2}$.

Additionally, the modulus calculated according to Equation 7 is $8\sqrt{2}$ if the offset and the phase rotation are not taken into account (i.e., the offset C is 0, the phase rotation factor $\beta$ is 1, and $\theta$ is 0). Then, by substituting the transmit power scaling factor $\alpha$, the phase rotation factor $\beta$, the relay receiving signal x, the offset C and the modulus B into the mapping function (i.e., Equation 1), the maximum possible amplitude of the relay signal 102 will be calculated to be $\sqrt{40}$, and the peak transmit power thereof is 40. Accordingly, the peak transmit power of the relay station for the relay signal 102 can be decreased from 72 (a square of the maximum possible amplitude of the relay receiving signal x, i.e., a square of $6\sqrt{2}$) to 40 as compared with the conventional Amplify-and-Forward (AF) signal processing scheme.

If the phase rotation is further taken into account (i.e., the value of the phase angle $\theta$ is greater than or equal to $-\pi/4$ and smaller than $\pi/4$, and the phase rotation factor $\beta$ is $e^{j\theta}$) but the offset is still not taken into account (i.e., the offset C is 0), the modulus is calculated to be 8 according to Equation 7, where let $\theta=-\pi/4$. Then, by substituting the transmit power scaling factor $\alpha$, the phase rotation factor $\beta$, the relay receiving signal x, the offset C and the modulus B into the mapping function (i.e., Equation 1), the maximum possible amplitude of the relay signal 102 will be calculated to be $4\sqrt{2}$, and the peak transmit power thereof is 32. Accordingly, the peak transmit power of the relay station for the relay signal 102 can be decreased from 72 (a square of the maximum possible amplitude of the relay receiving signal x, i.e., a square of $6\sqrt{2}$) to 32 as compared with the conventional Amplify-and-Forward (AF) signal processing scheme.

Furthermore, if the phase rotation is taken into account (i.e., the value of the phase angle $\theta$ is greater than or equal to $-\pi/4$ and smaller than $\pi/4$, and the phase rotation factor $\beta$ is $e^{j\theta}$) but the offset is still not taken into account (i.e., the offset C is 0) and the phase angle $\theta$ is let to be as shown by the following Equation 8:

$$\theta = \arg\min_{-\pi/4 \leq \theta_t < \pi/4} \max\{a_0 M_0 |h_0| \sec(\mathrm{mod}(\theta_0 + \theta_t, \pi/2)), \quad (8)$$
$$a_1 M_1 |h_1| \sec(\mathrm{mod}(\theta_1 + \theta_t, \pi/2))\}$$

where $\theta_t$ is a variable, and the output value obtained from the function $$\arg\min_{-\pi/4 \leq \theta_t < \pi/4} \max\{a_0 M_0 |h_0| \sec(\mathrm{mod}(\theta_0 + \theta_t, \pi/2)),$$
$$a_1 M_1 |h_1| \sec(\mathrm{mod}(\theta_1 + \theta_t, \pi/2))\}$$

is the phase angle $\theta$. The modulus is calculated to be 8 according to Equation 7, where the phase angle yielding this modulus is calculated to be $\theta=-\pi/4$ according to Equation 8. Then, by substituting the transmit power scaling factor $\alpha$, the phase rotation factor $\beta$, the relay receiving signal x, the offset C and the modulus B into the mapping function (i.e., Equation 1), the maximum possible amplitude of the relay signal 102 will be calculated to be $4\sqrt{2}$, and the peak transmit power thereof is 32. Accordingly, the peak transmit power of the relay station for the relay signal 102 can be decreased from 72 (a square of the maximum possible amplitude of the relay receiving signal x, i.e., a square of $6\sqrt{2}$) to 32 as compared with the conventional Amplify-and-Forward (AF) signal processing scheme.

Yet furthermore, if the phase rotation is taken into account (i.e., the value of the phase angle $\theta$ is greater than or equal to $-\pi/4$ and smaller than $\pi/4$, and the phase rotation factor $\beta$ is $e^{j\theta}$), and the offset is also taken into account and be such that $C=(B/2M_i)+j(B/2M_i)$, where $i=\arg\max\{a_i M_i |h_i| \sec(\mathrm{mod}(\theta_i+\theta_t,\pi/2))$, $i=0$ or $1\}$), then the modulus B is calculated to be 8 according to Equation 7, where the phase angle yielding this modulus is calculated to be $\theta=-\pi/4$ according to Equation 8, and C is $1+j$. Then, by substituting the transmit power scaling factor $\alpha$, the phase rotation factor $\beta$, the relay receiving signal x, the offset C and the modulus B into the mapping function (i.e., Equation 1), the maximum possible amplitude of the relay signal 102 will be calculated to be $3\sqrt{2}$, and the peak transmit power thereof is 18. Accordingly, the peak transmit power of the relay station for the relay signal 102 can be decreased from 72 (a square of the maximum possible amplitude of the relay receiving signal x, i.e., a square of $6\sqrt{2}$) to 18 as compared with the conventional Amplify-and-Forward (AF) signal processing scheme.

Next, the first wireless apparatus T0 calculates the second separated signal $r_0$ according to the first separated signal function (i.e., Equation 4), and the second wireless apparatus T1 calculates the first separated signal $r_1$ according to the second separated signal function (i.e., Equation 5).

Figure 2:
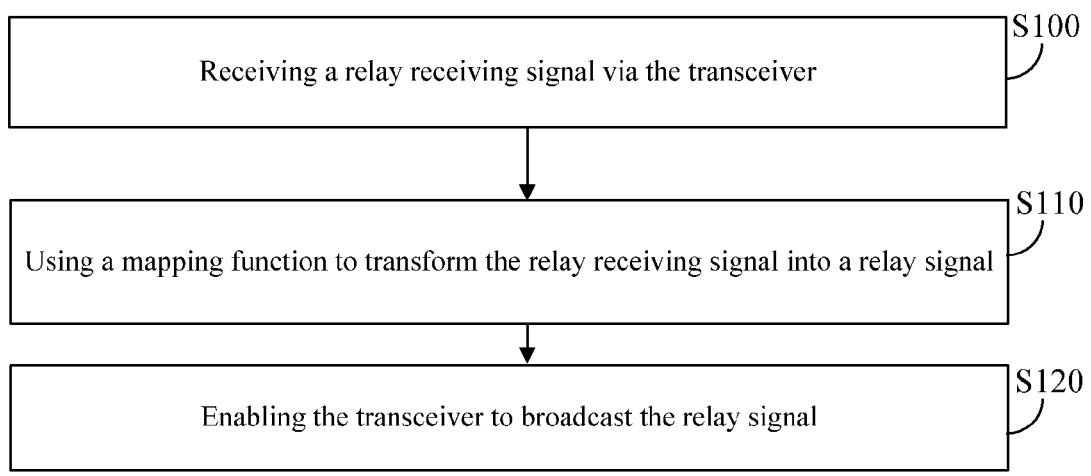
FIG. 2 is a flowchart diagram of a signal processing method according to a fifth embodiment of the present invention.

A fifth embodiment of the present invention is shown in FIG. 2, which is a flowchart diagram of a signal processing method. The signal processing method of this embodiment is for use in a two-way relay wireless communication apparatus, e.g., the two-way relay wireless communication apparatus R described in the first to the fourth embodiments. The two-way relay wireless communication apparatus R comprises a transceiver and a processor electrically connected with the transceiver. The signal processing method is executed by the processor.

Firstly, a relay receiving signal is received via the transceiver in step S100. The relay receiving signal comprises a first terminal transmitting signal transmitted by a first wireless apparatus and a second terminal transmitting signal transmitted by a second wireless apparatus. Then, the relay receiving signal is transformed into a relay signal by use of a mapping function in step S110. Finally, the transceiver is enabled to broadcast the relay signal in step S120.

It shall be appreciated that, the mapping function is as shown in Equation 1, and the complex modulo function and the modulo function defined in the mapping function are as defined in the first embodiment, so no further description will be made thereon herein.

In addition to the aforesaid steps, the signal processing method of the fifth embodiment can also execute all the operations and functions set forth in the first embodiment to the fourth embodiment. How the signal processing method of the fifth embodiment executes these operations and functions will be readily appreciated by those of ordinary skill in the art based on the explanation of the first embodiment to the fourth embodiment, and thus will not be further described herein.

According to the above descriptions, the two-way relay wireless communication apparatus of the present invention plays the relaying role through Modulo-and-Forward (MF) signal processing to reduce the relay transmit power of the two-way relay wireless communication apparatus. Thereby, the MF signal processing method of the present invention can reduce the transmit power of the two-way relay wireless communication apparatus as compared with the conventional AF signal processing method, and can reduce the computational complexity as compared with the conventional DF signal processing method.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A two-way relay wireless communication apparatus for a wireless communication system, comprising:
a transceiver, being configured to receive a relay receiving signal, wherein the relay receiving signal comprises a first terminal transmitting signal transmitted by a first wireless apparatus and a second terminal transmitting signal transmitted by a second wireless apparatus; and
a processor electrically connected to the transceiver, being configured to use a mapping function to transform the relay receiving signal into a relay signal and enable the transceiver to broadcast the relay signal;
wherein the mapping function is:

$$f_{MF}(x) = \alpha \cdot c \bmod(\beta x + C, B)$$

where, $\alpha$ is a transmit power scaling factor, $\beta$ is a phase rotation factor, x is the relay receiving signal, C is an offset, B is a modulus, and c mod(·) is a complex modulo function and is defined as follows:

$$c \bmod(x_I + jx_Q, B) = \bmod(x_I, B) + j \bmod(x_Q, B)$$

where $x_I$ is a real component of a complex input signal, $x_Q$ is an imaginary component of the complex input signal, and mod(·) is a modulo function and is defined as follows:

$$\bmod(A,B) = [(A + B/2) \% B] - B/2$$

where A is an input signal and % is an asymmetric modulo operator defined as follows: $p \% q = p - \lfloor p/q \rfloor q$ where p and q are any two real numbers and $\lfloor p/q \rfloor$ means taking the largest integer smaller or equal to p/q.

2. The two-way relay wireless communication apparatus as claimed in claim 1, wherein when the first terminal transmitting signal and the second terminal transmitting signal are pulse amplitude modulation (PAM) signals, the phase rotation factor is 1, the modulus is $2 \cdot \max(a_0 M_0 |h_0|, a_1 M_1 |h_1|)$, where $a_0$ and $a_1$ are signal scaling factors, $M_0$ is a PAM modulation order of the first terminal transmitting signal, $h_0$ is a first channel coefficient associated with the first terminal transmitting signal, $M_1$ is a PAM modulation order of the second terminal transmitting signal, and $h_1$ is a second channel coefficient associated with the second terminal transmitting signal.

3. The two-way relay wireless communication apparatus as claimed in claim 2, wherein the offset is $B/2M_i$, and $i = \arg\max(a_i M_i |h_i|, i=0$ or $1)$.

4. The two-way relay wireless communication apparatus as claimed in claim 1, wherein when the first terminal transmitting signal and the second terminal transmitting signal are quadrature amplitude modulation (QAM) signals, the modulus is $2 \cdot \max\{a_0 M_0 |h_0| \sec(\bmod(\theta_0 + \theta, \pi/2)), a_1 M_1 |h_1| \sec(\bmod(\theta_1 + \theta, \pi/2))\}$, where $a_0$ and $a_1$ are signal scaling factors, $M_0$ is a root value of a QAM modulation order of the first terminal transmitting signal, $h_0$ is a first channel coefficient associated with the first terminal transmitting signal, $\theta_0$ is a first channel phase angle of the first channel coefficient, $M_1$ is a root value of a QAM modulation order of the second terminal transmitting signal, $h_1$ is a second channel coefficient associated with the second terminal transmitting signal, $\theta_1$ is a second channel phase angle of the second channel coefficient, and $\theta$ is a phase angle whose value is greater than or equal to $-\pi/4$ and smaller than $\pi/4$, and the phase rotation factor is $e^{j\theta}$.

5. The two-way relay wireless communication apparatus as claimed in claim 4, wherein the value of the phase angle is $$\theta = \arg \min_{-\pi/4 \leq \theta_t < \pi/4} \max\{a_0 M_0 |h_0| \sec(\bmod(\theta_0 + \theta_t, \pi/2)),$$
$$a_1 M_1 |h_1| \sec(\bmod(\theta_1 + \theta_t, \pi/2))\},$$

where $\theta_t$ is a variable.

6. The two-way relay wireless communication apparatus as claimed in claim 4, wherein the offset is $(B/2M_i) + j(B/2M_i)$, and $i = \arg\max\{a_i M_i |h_i| \sec(\bmod(\theta_i + \theta, \pi/2)), i=0$ or $1\}$.

7. A signal processing method for a two-way relay wireless communication apparatus, the two-way relay wireless communication apparatus comprising a transceiver and a processor, the signal processing method being executed by the processor and comprising the following steps of:
(a) receiving a relay receiving signal via the transceiver, wherein the relay receiving signal comprises a first terminal transmitting signal transmitted by a first wireless apparatus and a second terminal transmitting signal transmitted by a second wireless apparatus;
(b) using a mapping function to transform the relay receiving signal into a relay signal; and
(c) enabling the transceiver to broadcast the relay signal;

wherein the mapping function is:

$$f_{MF}(x) = \alpha \cdot c \bmod(\beta x + C, B)$$

where, $\alpha$ is a transmit power scaling factor, $\beta$ is a phase rotation factor, x is the relay receiving signal, C is an offset, B is a modulus, and c mod($\cdot$) is a complex modulo function and is defined as follows:

$$c \bmod(x_I + jx_Q, B) = \bmod(x_I, B) + j \bmod(x_Q, B)$$

where $x_I$ is a real component of a complex input signal, $x_Q$, is an imaginary component of the complex input signal, and mod($\cdot$) is a modulo function and is defined as follows:

$$\bmod(A, B) = [(A + B/2) \% B] - B/2$$

where A is an input signal and % is an asymmetric modulo operator defined as follows: p % q=p−⌊p/q⌋q where p and q are any two real numbers and ⌊p/q⌋ means taking the largest integer smaller or equal to p/q.

8. The signal processing method as claimed in claim 7, wherein when the first terminal transmitting signal and the second terminal transmitting signal are pulse amplitude modulation (PAM) signals, the phase rotation factor is 1, the modulus is $2 \cdot \max(a_0 M_0 |h_0|, a_1 M_1 |h_1|)$, where $a_0$ and $a_1$ are signal scaling factors, $M_0$ is a PAM modulation order of the first terminal transmitting signal, $h_0$ is a first channel coefficient associated with the first terminal transmitting signal, $M_1$ is a PAM modulation order of the second terminal transmitting signal, and $h_1$ is a second channel coefficient associated with the second terminal transmitting signal.

9. The signal processing method as claimed in claim 8, wherein the offset is $B/2M_i$, and i=arg max $(a_i M_i |h_i|, i=0$ or 1$)$.

10. The signal processing method as claimed in claim 7, wherein when the first terminal transmitting signal and the second terminal transmitting signal are quadrature amplitude modulation (QAM) signals, the modulus is $2 \cdot \max\{a_0 M_0 |h_0| \sec(\bmod(\theta_0 + \theta, \pi/2)), a_1 M_1 |h_1| \sec(\bmod(\theta_1 + \theta, \pi/2))\}$, where $a_0$ and $a_1$ are signal scaling factors, $M_0$ is a root value of a QAM modulation order of the first terminal transmitting signal, $h_0$ is a first channel coefficient associated with the first terminal transmitting signal, $\theta_0$ is a first channel phase angle of the first channel coefficient, $M_1$ is a root value of a QAM modulation order of the second terminal transmitting signal, $h_1$ is a second channel coefficient associated with the second terminal transmitting signal, $\theta_1$ is a second channel phase angle of the second channel coefficient, and $\theta$ is a phase angle whose value is greater than or equal to $-\pi/4$ and smaller than $\pi/4$; and the phase rotation factor is $e^{j\theta}$.

11. The signal processing method as claimed in claim 10, wherein the value of the phase angle is $$\theta = \arg \min_{-\pi/4 \leq \theta_t < \pi/4} \max\{a_0 M_0 |h_0| \sec(\bmod(\theta_0 + \theta_t, \pi/2)),$$
$$a_1 M_1 |h_1| \sec(\bmod(\theta_1 + \theta_t, \pi/2))\},$$

where $\theta_t$ is a variable.

12. The signal processing method as claimed in claim 10, wherein the offset is $(B/2M_i) + j(B/2M_i)$, and i=arg max$\{a_i M_i |h_i| \sec(\bmod(\theta_i + \theta, \pi/2)), i=0$ or 1$\}$.

13. A wireless apparatus in the wireless communication system as claimed in claim 1, wherein when the wireless apparatus is the first wireless apparatus, the wireless apparatus is configured to receive a first terminal receiving signal corresponding to the relay signal from the two-way relay wireless communication apparatus and, according to a first separated signal function, obtain a second separated signal corresponding to the second terminal transmitting signal, and the first separated signal function is defined as follows:

$$r_0 = c \bmod(y_0/h_0/\alpha - C - \beta h_0 x_0, B)/\beta$$

where, $r_0$ is the second separated signal, $y_0$ is the first terminal receiving signal, and $x_0$ is the first terminal transmitting signal; and when the wireless apparatus is the second wireless apparatus, the wireless apparatus is configured to receive a second terminal receiving signal corresponding to the relay signal and, according to a second separated signal function, obtain a first separated signal corresponding to the first terminal transmitting signal, and the second separated signal function is defined as follows:

$$r_1 = c \bmod(y_1/h_1/\alpha - C - \beta h_1 x_1, B)/\beta$$

where, $r_1$ is the first separated signal, $y_1$ is the second terminal receiving signal, and $x_1$ is the second terminal transmitting signal; and wherein the first terminal transmitting signal is transmitted by the first wireless apparatus and is to be transmitted to the second wireless apparatus via the two-way relay wireless communication apparatus, and the second terminal transmitting signal is transmitted by the second wireless apparatus and is to be transmitted to the first wireless apparatus via the two-way relay wireless communication apparatus.

14. The wireless apparatus as claimed in claim 13, wherein when the first terminal transmitting signal and the second terminal transmitting signal are pulse amplitude modulation (PAM) signals, the phase rotation factor is 1, the modulus is $2 \cdot \max(a_0 M_0 |h_0|, a_1 M_1 |h_1|)$, where $a_0$ and $a_1$ are signal scaling factors, $M_0$ is a PAM modulation order of the first terminal transmitting signal, and $M_1$ is a PAM modulation order of the second terminal transmitting signal.

15. The wireless apparatus as claimed in claim 14, wherein the offset is $B/2M_i$, and i=arg max $(a_i M_i |h_i|, i=0$ or 1$)$.

16. The wireless apparatus as claimed in claim 13, wherein when the first terminal transmitting signal and the second terminal transmitting signal are quadrature amplitude modulation (QAM) signals, the modulus is $2 \cdot \max\{a_0 M_0 |h_0| \sec(\bmod(\theta_0 + \theta, \pi/2)), a_1 M_1 |h_1| \sec(\bmod(\theta_1 + \theta, \pi/2))\}$, where $a_0$ and $a_1$ are signal scaling factors, $M_0$ is a root value of a QAM modulation order of the first terminal transmitting signal, $h_0$ is a first channel coefficient associated with the first terminal transmitting signal, $\theta_0$ is a first channel phase angle of the first channel coefficient, $M_1$ is a root value of a QAM modulation order of the second terminal transmitting signal, $h_1$ is a second channel coefficient associated with the second terminal transmitting signal, $\theta_1$ is a second channel phase angle of the second channel coefficient, and $\theta$ is a phase angle whose value is greater than or equal to $-\pi/4$ and smaller than $\pi/4$; and the phase rotation factor is $e^{j\theta}$.

17. The wireless apparatus as claimed in claim 16, wherein the value of the phase angle is $$\theta = \arg \min_{-\pi/4 \leq \theta_t < \pi/4} \max\{a_0 M_0 |h_0| \sec(\bmod(\theta_0 + \theta_t, \pi/2)),$$
$$a_1 M_1 |h_1| \sec(\bmod(\theta_1 + \theta_t, \pi/2))\},$$

where $\theta_t$ is a variable.

18. The wireless apparatus as claimed in claim 16, wherein the offset is $(B/2M_i)+j(B/2M_i)$, and $i=\arg \max\{a_i M_i |h_i| \sec(\mathrm{mod}(\theta_i+\theta,\pi/2))$, $i=0$ or $1\}$.

\* \* \* \* \*